Jan. 24, 1956

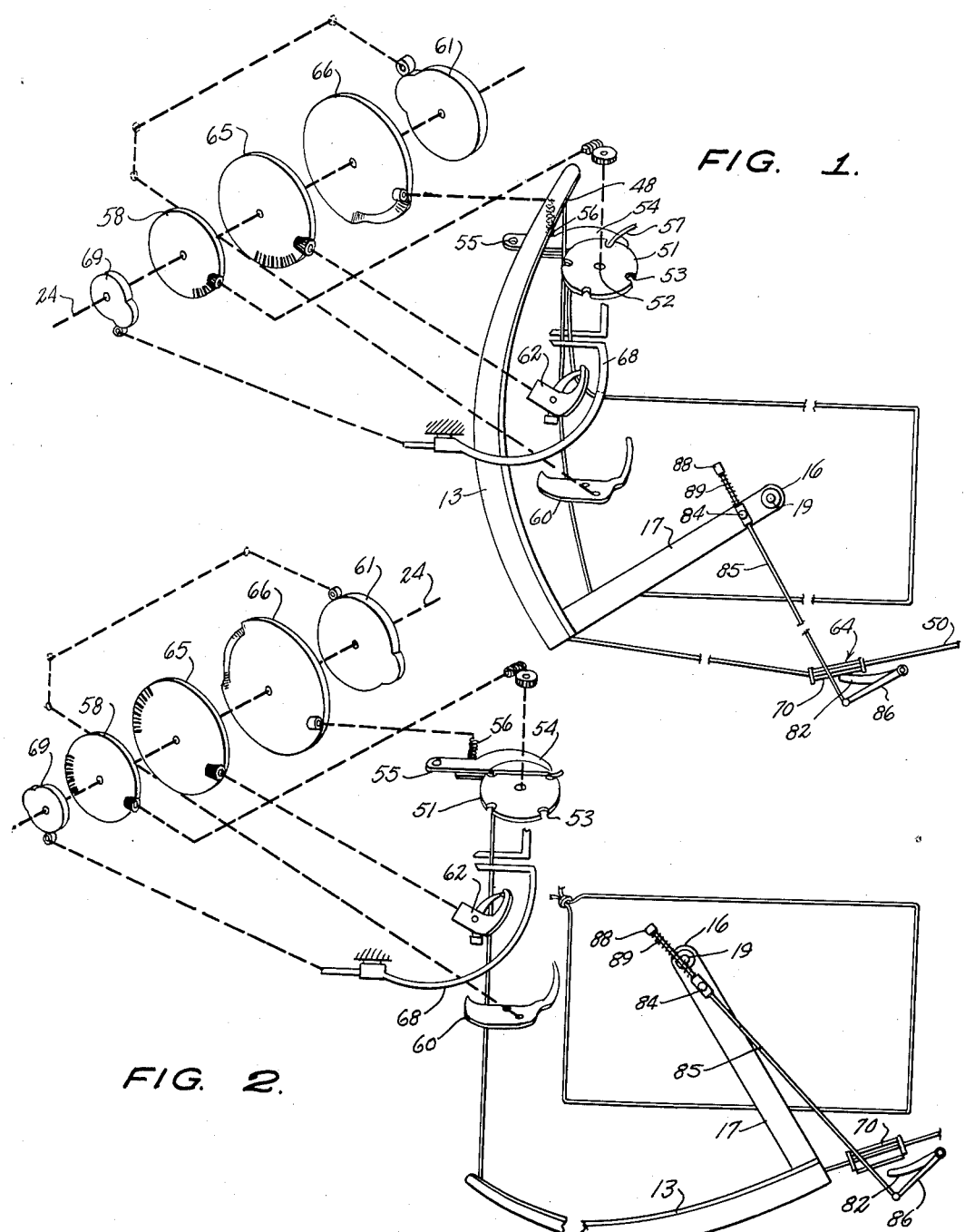

C. S. RUDEEN 2,731,909

TWINE TENSIONING ATTACHMENT FOR BALING MACHINE

Filed Jan. 23, 1953

INVENTOR.
CARL S. RUDEEN,
BY
McMorrow, Berman & Davidson
ATTORNEYS.

United States Patent Office 2,731,909
Patented Jan. 24, 1956

2,731,909

TWINE TENSIONING ATTACHMENT FOR BALING MACHINE

Carl S. Rudeen, Pocatello, Idaho

Application January 23, 1953, Serial No. 332,936

4 Claims. (Cl. 100—22)

This invention relates to twine tensioning attachments for baling machines and more particularly to an intermittently operative twine tensioning attachment for a twine tying hay baling machine.

In the operation of the twine knotting mechanism of a hay baling machine, one end of the twine is held in the twine holder of the knotting mechanism and the twine runs from the holder through the eye of the associated needle, along the needle and to the twine ball. The twine holder is at one side and the retracted needle at the other side of the bale chamber and, as the bale is formed, the twine between the twine holder and the eye of the needle is pushed along the bale chamber to extend around the bale as the bale is formed in the bale chamber. At this time the twine is subjected to heavy friction as it is pulled through the needle eye and around the bale and forced along the bale chamber and it is highly important that no additional resistance or tension be applied at this time to the twine between the needle eye and the twine ball, as any such additional resistance or tension has a tendency to break the twine or pull it out of the twine holder.

When the bale has been completely formed, the needle is tripped and carries the portion of the twine extending through the needle eye through the bale chamber behind the newly formed bale to the twine holder which grasps the twine carried to it by the needle and thus, holds both ends of the twine looped around the newly formed bale. Immediately after the needle carried twine is grasped by the twine holder, a twine finger or tucker finger operating in timed relationship to the movement of the needle, engages the needle carried twine and pulls this portion of the twine against the billhook of the knotting mechanism. As the twine extending from the twine holder to the bale is already against the billhook, both ends of the bale loop are now theoretically pulled against the billhook as the billhook starts to rotate to tie the two ends of the twine looped together. It has been found in practice, however, that if there is insufficient tension on the twine between the needle and the twine ball at the time the needle carries the twine to the twine holder, the needle may fail to properly place the twine in the twine holder. Also, the twine finger may fail to pull the needle carried twine against the billhook because of the interference of bale material, such as hay or straw, adjacent the billhook, and, even if the twine is pulled against the billhook, if it is loose, it has a tendency to slip over the end of the billhook, so that it is not pulled into the knot by the billhook. Any of these conditions will cause the knotting mechanism to fail to tie a knot and a loose or untied bale will consequently be discharged from the machine.

It is, accordingly, among the objects of the present invention to provide a twine tensioning attachment which engages the twine between the needle and the twine ball and operates in timed relationship to the operation of the needle to place the twine under tension at the time the twine finger moves the needle carried twine against the billhook of the knotting mechanism and when the billhook starts to rotate, and to release the twine from tension at all other times, particularly while a new bale is being formed in the bale chamber and while the billhook is actually forming a knot in the twine; which attachment can be easily installed on an existing baling machine with no material modification of the baling machine construction, and actuated by the needle operating mechanism of the machine to apply tension intermittently to the twine in timed relationship to the movement of the associated needle; which is provided in duplicate when the needles and knotting mechanism are provided in duplicate to handle two strands of twine extending around each bale; which is readily adjustable to vary the tension applied to the twine; and which is simple and durable in construction, economical to manufacture and install, and effective and efficient in operation.

Other objects and advantages will become apparent from a consideration of the following description and the appended claims in conjunction with the accompanying drawing wherein:

Figure 1 is a diagrammatic perspective view of a needle and twine tying mechanism of a baling machine with a twine tensioning device illustrative of the invention operatively applied thereto;

Figure 2 is a diagrammatic perspective view similar to Figure 1 showing the parts in a different operative position from that illustrated in Figure 1;

Figure 3:
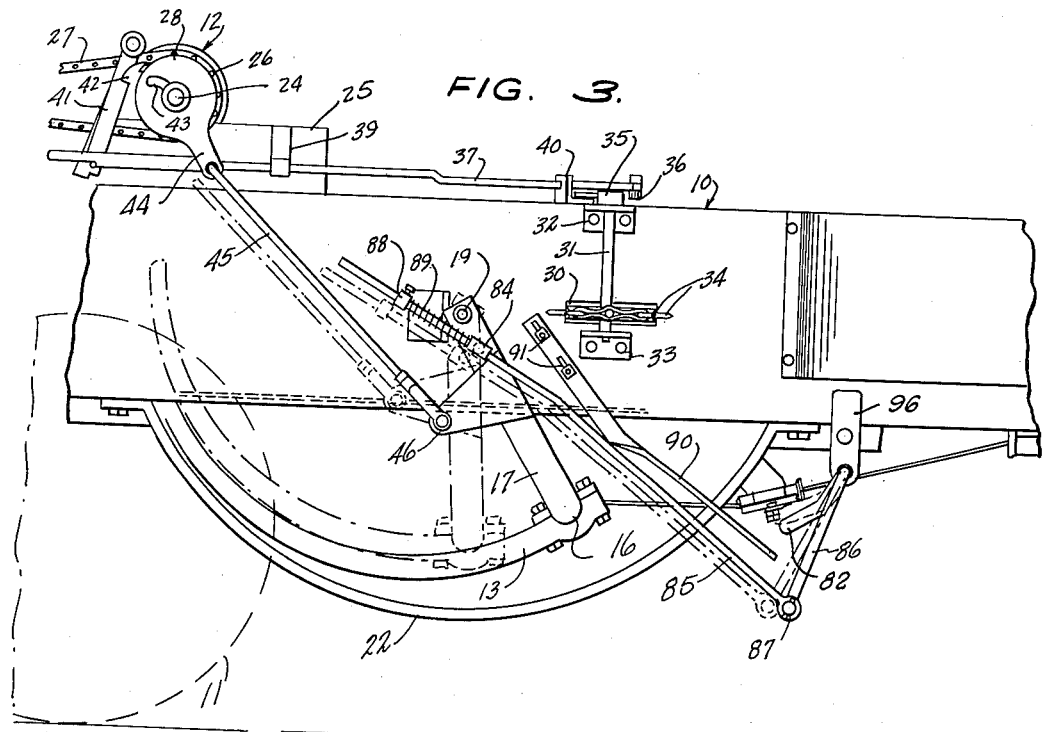
Figure 3 is a side elevational view of a fragmentary intermediate portion of a baling machine, showing a portion of the bale chamber, the twine carrying needles and the twine knotting mechanism of the machine.
Figure 4:
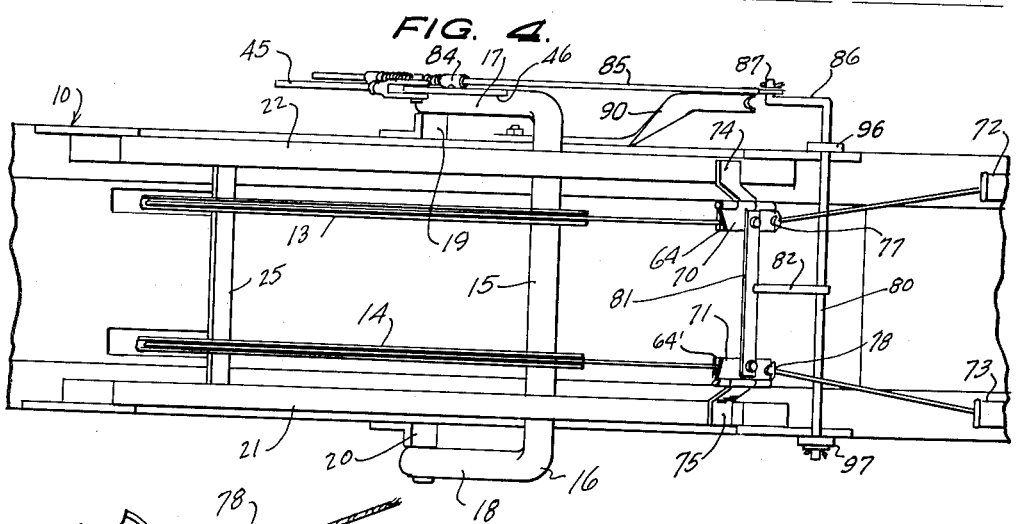
Figure 4 is a view of the bottom of the fragmentary machine portion of Figure 3 after the latter portion has been turned upwardly 90°.

The numeral 10 in Figures 3 and 4 generally indicates the bale forming portion or bale chamber of a mobile baling machine supported on ground engaging wheels, as indicated at 11. The hay is fed into the bale chamber by conventional pickup and feed means, not shown, and is packed into and forced through the bale chamber by packing means, well known to the art. As the bales are packed in and forced through the bale chamber, two strands of twine are wrapped around each bale and the ends of each loop of twine are knotted together when the corresponding bale is completed, and then, after the strands have been tied, the completed bales are discharged from the machine.

The numeral 12 generally indicates a twine knotting mechanism which, in the arrangement illustrated, is mounted on the top of the bale chamber, and the numerals 13 and 14 indicate longitudinally curved, twine carrying needles disposed below the bale chamber 10 in spaced apart and substantially parallel relationship to each other. The needles 13 and 14 are mounted at corresponding ends thereof on the intermediate or bight portion 15 of a U-shaped needle carrier 16, the legs 17 and 18 of which are disposed at respectively opposite sides of the bale chamber and pivotally connected near their distal ends to the bale chamber by the pivot mountings 19 and 20, the arrangement being such that when the needle carrier 16 is swung about the common axis of the pivotal connections of its legs with the bale chamber 10, the ends of the needles 13 and 14 remote from the carrier 16 are forced upwardly through the bale chamber behind a newly completed bale in the bale chamber and through the knotting mechanism 12 to carry the bottom portions of the twine loops extending around the bale to the knotting mechanism.

Needle guards 21 and 22 of arcuate shape are secured to the bottom side of the bale chamber 10 and extend longitudinally of and depend from the bale chamber with the guard 22 spaced from the outer side of the needle 13 and the guard 21 spaced from the outer side of the needle 14.

The knotting mechanism 12 includes a drive shaft 24 disposed above a platform 25 mounted on the top of the bale chamber and suitably journaled on the platform. A chain sprocket 26 is journaled on the drive shaft 24 and is constantly driven through a chain 27 from a continuously operating, power driven portion of the baling machine. A one-rotation clutch 28 is mounted on the shaft 24 and is effective to connect the chain sprocket 26 to the shaft 24 to impart one complete rotation to the shaft and then disconnect the sprocket from the shaft.

A bale measuring wheel 30 is mounted on a shaft 31 which is vertically disposed at one side of the bale chamber 10 and journaled at its opposite ends in vertically spaced apart bearing brackets 32 and 33. The measuring wheel 30 extends through an opening in the adjacent side of the bale chamber and has angularly spaced-apart points 34 which engage the side of the bale disposed in the bale chamber, so that the bale rotates the measuring wheel as the bale moves through the bale chamber. When the measuring wheel has been rotated through one complete rotation, the corresponding bale is terminated and tied. The shaft 31 has on its upper end a cam formation 35 which engages a cam follower 36 mounted on a link rod 37 slidably mounted in guides 39 and 40, so that the link rod 37 is moved longitudinally each time the measuring wheel 30 completes one rotation. At its end remote from the cam follower 36 the link rod 37 is connected to a clutch actuating lever 41 pivoted at its upper end on a fixed support and provided intermediate its length with a notch 42 in which a clutch trip finger 43 is normally received. While the finger 43 is engaged in the notch 42 the clutch is held out of engagement and the sprocket wheel 26 rotates freely on the shaft 24. When the measuring wheel 30, however, completes a rotation, it moves the link rod 37 in a direction to swing the clutch actuating lever 41 away from the clutch trip finger 43 releasing this finger and engaging the clutch. The clutch, together with the finger 43, then makes one complete rotation and is disconnected when the finger 43 again engages in the notch 42, the lever 41 having been moved back to its clutch disengaging position at this time.

A radial arm 44 extends from the clutch 28 and a link 45 is pivotally connected at one end to the arm 44 at the distal end of this arm and at its other end to the outer end of an arm 46 mounted upon and projecting outwardly from the leg 17 of the needle carrier 16.

With this arrangement, each time the arm 44 is driven through a complete rotation by the engagement of the one-rotation clutch 28, the distal, twine carrying ends of the needles 13 and 14 are moved upwardly through the bale chamber from the lower side of the bale chamber past the knotting mechanism 12 to carry the bottom portions of the twine loops extending around the bale to the knotting mechanism at the completion of the bale.

Figures 1 and 2 illustrate the manner in which the bottom portion of the twine loop is brought to the knotting mechanism by the needles, these figures showing only one needle and one unit of the knotting mechanism, it being understood that the needle and knotting mechanism unit are duplicated where two strands of twine are tied around each bale produced by the baling machine. The needle 13 has near its distal end a twine receiving eye 48 and the twine 50 extends from the twine ball to the proximal end of the needle, along the needle to the eye 48, through the eye and from the eye to the bottom edge of the rear end of the bale in the bale chamber, forwardly along the bottom of the bale, upwardly at the front end of the bale, rearwardly along the top of the bale and from the top edge of the rear end of the bale to a twine holder 51 constituting a component of the twine knotting mechanism of the machine.

The twine holder 51, which is of well known construction, comprises a pair of circular discs disposed in superimposed relationship and rotatably supported at their centers, as indicated at 52. The discs are provided with spaced apart peripheral notches 53 and are disposed at respectively opposite sides of a fixed plate, not illustrated. A twine clamping arm 54 is pivotally mounted at one end on a fixed support by a pivotal mounting 55 and bears against the peripheral edges of the notched discs over an arcuate portion of these peripheral edges and is held in clamping engagement with the peripheral edges of the discs by a compression spring 56. These discs 52 are rotated by a sector gear 58 mounted on the drive shaft 24. The spring 56 has a movable abutment at its end remote from the clamp arm 54 and this movable abutment is controlled by cam 66 also mounted on the drive shaft 24 which cam acts to relieve the pressure exerted by the movable abutment on the clamp spring 56, thereby relieving the pressure between the clamp arm 54 and the opposed edges of the twine holder discs.

The other components of the conventional knotting mechanism 12, as shown in Figures 1 and 2, include a twine finger 60 and bill hook 62 having the usual movable jaw and fixed jaw. The twine finger 60 is pivoted by the cam 61 and the bill hook 62 is rotated by the sector gear 65. The movable jaw of the bill hook is actuated, in conventional timed relation to the operation of the other elements of the knotting mechanism, by a cam, not shown. Mounted on the baling machine 10 to cooperate with the knotting mechanism is the conventional severing blade or knife 68, which is actuated by a cam 69 mounted on the drive shaft 24.

It will thus be seen that the twine tensioning attachment 64 is effective to apply tension to the twine extending from the twine ball to the needle during a brief interval of time only as the needle approaches and leaves its uppermost position in its movement carrying the twine from the lower side of the bale to the knotting mechanism, and that the twine extending from the needle is under tension at the time the twine finger acts to move the twine against the billhook and during the first portion of the rotation of the billhook in which the billhook moves to firmly engage both ends of the twine loop extending around the newly completed bale in the baling machine.

The twine tensioning attachment of the present invention, as generally indicated at 64 in Figures 1 and 2, is provided in duplicate for a double tying mechanism, is indicated at 64 and 64' in Figure 4, and may take various structural forms within the scope of the invention. In the arrangement illustrated, a pair of butt hinges 70 and 71 are disposed below the bale chamber 10 with one adjacent each side of the bale chamber 10 of the baling machine between the proximal ends of the needles 13 and 14, when the needles are fully retracted, and the twine guides 72 and 73 which guide the twine from the twine balls to the needles 13 and 14 respectively. The hinge 70 is mounted on the needle guard 21 near the adjacent end of this needle guard by a bracket 74, and the hinge 71 is similarly mounted on the needle guard 22 by a bracket 75, the bracket in each case being secured to the upper leaf of the corresponding hinge. The hinge pins of the hinges 70 and 71 extend longitudinally of the portions of the twine between the guides 72 and 73 and the needles 13 and 14 respectively, and the two leaves or jaws of each hinge are disposed in superimposed relationship relative to each other with the corresponding twine portion disposed between the two leaves. The upper leaf of the hinge 70 is fixed in position by the bracket 74 secured thereto, and the upper leaf of the hinge 71 is fixed in position by the bracket 75 secured thereto. The lower leaves of the hinges are, however, movable toward and away from the fixed upper leaves to intermittently compress the corresponding twine portions between the two leaves of each hinge.

A twine guide 77 in the form of a ring or grommet is secured to the fixed upper leaf of the hinge 70 at the end of this leaf nearest the twine guide 72 to maintain the corresponding twine portion between the leaves of the hinge 70, and a similar guide 78 is secured to the end of the fixed upper leaf of the hinge 71 nearest the twine guide 73. Each of the guides 77, 78 has a flange, such as that indicated at 95 in Figure 5 for the guide 78, for limiting the movement of the lower leaf of each hinge away from the fixed upper leaf. At the inner sides of the twine guides 77 and 78 the adjacent surfaces of the hinge leaves are recessed to provide tapered openings leading from the guides 77 and 78 between the adjacent surfaces of the corresponding hinge leaves, so that knots or irregular portions of the twine will pass between the leaves without difficulty.

Figure 5:
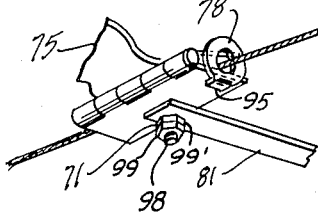
Figure 5 is a perspective view of a fragmentary portion of the twine tensioning mechanism of the invention.

A crankshaft 80 extends transversely of the under side of the bale chamber between the hinges 70 and 71 and the twine guides 72 and 73 and is journaled in bearing brackets 96 and 97 secured to and depending from the bale chamber 10 at respectively opposite sides of the bale chamber. A resilient bar 81 extends between and abuts the lower leaves of the hinges 70 and 71 and is connected at its ends to the lower leaves of the hinges 70 and 71 by a loose or lost-motion connection. The loose connections of the bar 81 to the hinges 70 and 71 are identical and, hence, only the connection to the hinge 71 will be described. The connection of the bar 81 to the hinge 71, as shown in Figure 5, comprises a threaded bolt 98 carried by the lower leaf of the hinge 71 and a pair of nuts 99, 99'. The bolt 98 extends loosely through an enlarged opening, not shown, provided in the end of the bar 81. A resilient arm 82 extends perpendicularly from the crank shaft 80 and contacts the underside of the bar 81 substantially at the midlength location of this bar and is effective, upon a rotational movement of the crank shaft 80 in the proper direction, to apply an upward pressure to the bar 81, which, in turn, applies upward pressure to the lower, movable leaves of the hinges 70 and 71, thereby applying tension to the twine passing between the leaves during the interval that the arm 82 exerts upward pressure on the bar 81.

A guide sleeve 84 is pivotally mounted on the leg 17 of the needle carrier 16 at a location spaced a predetermined distance from the axis of the pivotal mounting 19 of this leg on the baling machine 10. A link rod 85 extends slidably through the sleeve 84 and is pivotally connected at one end to the crank 86 of the crankshaft 80, as indicated at 87. A stop collar 88 is adjustably mounted on the rod 85 adjacent to but spaced from the other end thereof, and a compression spring 89 surrounds the rod 85 between the guide sleeve 84 and the collar 88.

A limit stop abutment 90 is adjustably mounted on the side of the bale chamber 10 adjacent the rod 85, as indicated at 91, and is inclined downwardly from the bale chamber and toward the crank 86 of the crankshaft 80. This limit stop member has its lower end so positioned that when the desired amount of pressure has been placed on the twine extending through the hinges 70 and 71, the crank 86 contacts the adjacent end of this member 90 and further movement of the crank in a direction to increase the tensioning pressure on the twine is terminated, any further movement of the needle carrier 16 from this time on being taken up by further compression of the spring 89.

In operation: The baling operation begins with one strand of twine threaded through the baling chamber of the machine 10 and positioned within one of the notches 53 of the circular discs forming the twine holder 51 with the twine held in place by the clamping arm 54. As material is fed into the baling machine, a conventional plunger, not shown, reciprocates and forces the gathered material through the machine 10 and past the knotting mechanism 12 toward the bale measuring wheel 30. The gathered material engages the twine extending across the baling chamber and draws the twine from the retracted needle, as the material moves through the chamber, so that the twine extends across the top, across one end, and across the bottom of the material to be tied in a bale.

As the material moves past and engages the bale measuring wheel 30, the wheel 30 turns and, when a predetermined amount of material has moved past the wheel, the cam 35 moves the link rod 37 to release the clutch trip finger 43 from the notch 42 of the clutch actuating lever 41, as shown in Figure 3. The clutch 28 then engages the chain sprocket 26 to rotate the drive shaft 24.

As the clutch 28 rotates in a clockwise direction, as in Figure 3, it acts through the radial arm 44, the link 45, and the arm 46 to pivot the needle carrier 16 about the bearings 19 and 20 in a clockwise direction. As a result, the needles 13 and 14 swing upwardly through the baling chamber and rearwardly of the material to be baled. Each needle carries a strand of twine into the knotting mechanism where the strand is laid into a notch 43 of the circular discs of the twine holder 51 and secured therein, adjacent the original strand of twine, by the clamping arm 54.

Simultaneous with the positioning of the strand in the notch, the novel twine tensioning means of the present invention is actuated to apply tension to the twine, in the following manner. While the needles 12 and 14 are being moved upwardly, the guide sleeve 84 on the leg 17 of the carrier 16, as shown in Figures 1 and 2, is pivoted and slid along the rod 85 toward the collar 88, compressing the spring 89. When the spring 89 is compressed to a predetermined point, it resists further movement of the guide sleeve 84 toward the collar 88. The motion of the carrier 16 is then transmitted through the sleeve 84 to the rod 85 and the crank 86 is pivoted in a clockwise direction, as shown in dotted line in Figure 3. The arm 82 on the crank shaft 80 is then moved into abutting contact with the bar 81, which extends between the hinges 70 and 71. As a result, the bar 81 forces the lower movable leaf of each hinge upwardly and thereby applies tension to the twine positioned between the leaves of the respective hinges.

After the strand of twine has been laid into the notch of the twine holder discs, the discs begin to rotate with the two strands of twine positioned therein. The twine finger 60 is pivoted by the cam 61 and engages the strand of twine, now under tension, carried to the knotting mechanism by the needle 13 and brings the latter taut strand into side by side relation with the twine strand originally held in the twine holder 51, as shown in Figure 1. The taut condition of the twine at this time insures the engagement of the twine by the finger 60, and prevents any bale material, such as hay or straw, from pushing aside the twine strand as the finger 60 starts its pivotal movement. Further, the tension applied at this moment in the baling operation insures that the twine will be definitely engaged in the proper notch of the twine holder discs as the discs rotate.

The sector gear 65, carried by the drive shaft 24, now begins to rotate the bill hook 62. As the bill hook 62 rotates, it engages the double strand of twine and wraps the two strands about its jaws, in the conventional manner, to form a loop.

Simultaneous with the formation of the loop, the needle carrier 16 and needle 13 begin the counterclockwise or downward swing. This movement of the needle carrier 16 causes the crank 86 to move in a counterclockwise direction also to thereby withdraw the arm 82 from abutting contact with the bar 81. In this way, the bar 81 is permitted to fall due to gravity. Without the pressure of the bar 81, the lower movable leaves of the hinges 70 and 71 also drop and pivot away from the upper fixed leaves to thereby release the tension on the twine passing between the respective leaves.

During the releasing of the tension on the twine, the bill hook 62 continues to rotate. After the loop has been formed, the movable jaw of the bill hook 62 is pivoted away from the fixed jaw, in the conventional manner, to thereby receive between the movable and fixed jaws the portion of the double strand adjacent the loop. As the bill hook 62 completes its rotation, the movable jaw is pivoted toward the fixed jaw, in the conventional manner, and grips the twine positioned between the fixed and movable jaws.

The discs of the holder 51 have now been rotated to a point, so that as the needle 13 drops on its reverse stroke, the twine carried by the needle is laid back across the disc into a new notch, as shown in Figure 2, resulting in the draping of three twine strands from the twine holder 51; namely, the original twine strand extending across the top portion of the bale and forming one part of the knot, the strand extending across the lower portion of the bale and forming the other part of the knot, and the new strand just laid back across the circular disc of the holder 51.

The twine severing knife 68 is then actuated by the cam 69 and severs the strand of twine, which extends across the bottom of the bale, at a point located between the knot and the twine holder 51.

The needle carrier 16 and needle 13 continue in their reverse stroke in a counterclockwise direction until they reach the lowest position, as shown in Figure 2. The plunger, not shown, now begins to force the newly gathered material in the baling machine toward the newly formed bale to thereby move the latter bale out of the baling chamber and strip the knot off of the bill hook 62. The bale tying cycle is thereby completed, and a new one is begun.

The twine tensioning attachment thus acts to intermittently tension the twine at the time the needle carried twine is being placed in the twine holder and the needle carried twine is being moved into engagement with the billhook by the twine finger and the billhook is initially moving to engage the twine. At all other times, no tension is applied to the twine extending from the twine balls to the needles.

The invention may be embodied in other specific forms without departing from the spirit or essential characteristics thereof; for example, on a baling machine wherein the needels move through the side rather than through the bottom or top of the baling chamber. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. The combination with a baling machine having a baling chamber, twine knotting mechanism positioned adjacent said chamber, a needle for carrying twine movable through said baling chamber toward and away from said knotting mechanism, and driving means operatively connected to said needle for effecting the movement of the latter; of twine tensioning means carried by said baling machine and operable by said driving means when said needle is within a predetermined distance of said knotting mechanism to apply tension to said twine, said twine tensioning means including a pair of leaves for receiving the twine therebetween positioned adjacent said needle, one of said leaves being fixed and the other of said leaves being movable toward and away from said one leaf, a resilient bar extending tranversely of said leaves and having one end connected to said movable other leaf, a crankshaft spaced transversely of said bar and carried by the baling chamber, and a resilient arm projecting perpendicularly from the intermediate portion of said crankshaft and engageable with said resilient bar.

2. The combination with a baling machine having a baling chamber, twine knotting mechanism positioned adjacent said chamber, a needle for carrying twine movable through said baling chamber toward and away from said knotting mechanism, and driving means operatively connected to said needle for effecting the movement of the latter; of twine tensioning means carried by said baling machine and operable by said driving means when said needle is within a predetermined distance of said knotting mechanism to apply tension to said twine, said twine tensioning means including a pair of leaves for receiving the twine therebetween positioned adjacent said needle, one of said leaves being fixed and the other of said leaves being movable toward and away from said one leaf, a resilient bar extending transversely of said leaves and having one end connected to said movable other leaf, a crankshaft spaced transversely of said bar and carried by the bailing chamber, a resilient arm projecting perpendicularly from the intermediate portion of said crankshaft and engageable with said resilient bar, and means on said fixed one leaf and engageable with said movable other leaf for limiting the movement of said movable other leaf away from the said one fixed leaf.

3. The combination with a baling machine having a baling chamber, twine knotting mechanism positioned adjacent said chamber, a needle for carrying twine movable through said baling chamber toward and away from said knotting mechanism, and driving means operatively connected to said needle for effecting the movement of the latter; of twine tensioning means carried by said baling machine and operable by said driving means when said needle is within a predetermined distance of said knotting mechanism to apply tension to said twine, said twine tensioning means including a pair of leaves for receiving the twine therebetween positioned adjacent said needle, one of said leaves being fixed and the other of said leaves being movable toward and away from said one leaf, a resilient bar extending transversely of said leaf and having one end connected to said movable other leaf, a crankshaft spaced transversely of said bar and carried by the bailing chamber, a resilient arm projecting perpendicularly from the intermediate portion of said crankshaft and engageable with said resilient bar, a crank on one end of said crankshaft, means on said fixed one leaf and engageable with said movable other leaf for limiting the movement of said movable other leaf away from said one fixed leaf, and stop means for limiting the tensioning pressure applied to said twine, said stop means embodying an abutment adjacent said crank and carried by said baling chamber and engageable with said crank.

4. The combination with a baling machine having a baling chamber, twine knotting mechanism positioned adjacent said chamber, a needle for carrying twine movable through said baling chamber toward and away from said knotting mechanism, and driving means operatively connected to said needle for effecting the movement of the latter; of twine tensioning means carried by said baling machine and operable by said driving means when said needle is within a predetermined distance of said knotting mechanism to apply tension to said twine, said twine tensioning means including resilient means limiting the tensioning pressure applied to said pair of leaves for receiving the twine therebetween positioned adjacent said needle, one of said leaves being fixed and the other of said leaves being movable toward and away from said one leaf, a resilient bar extending transversely of said leaves and having one end connected to said movable other leaf, and a resilient arm arranged perpendicularly with respect to said bar and operatively connected to said baling chamber for movement into and out of engagement with said resilient bar.

References Cited in the file of this patent

UNITED STATES PATENTS

| 1,257,474 | Freeman | Feb. 26, 1918 |
| 2,346,786 | Radeck | Apr. 18, 1944 |
| 2,403,396 | Raney | July 2, 1946 |
| 2,470,724 | Ronning et al. | May 17, 1949 |
| 2,484,890 | Hill | Oct. 18, 1949 |
| 2,566,054 | Burkett | Aug. 28, 1951 |